US011028519B2

(12) United States Patent
Lee et al.

(10) Patent No.: US 11,028,519 B2
(45) Date of Patent: *Jun. 8, 2021

(54) WASHING MACHINE HAVING CIRCULATION NOZZLES

(71) Applicant: LG Electronics Inc., Seoul (KR)

(72) Inventors: Junghoon Lee, Seoul (KR); Kyungchul Woo, Seoul (KR); Jaehyun Kim, Seoul (KR); Myunghun Im, Seoul (KR); Hyundong Kim, Seoul (KR); Hwanjin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

This patent is subject to a terminal disclaimer.

(21) Appl. No.: 16/186,321

(22) Filed: Nov. 9, 2018

(65) Prior Publication Data
US 2019/0136442 A1 May 9, 2019

(30) Foreign Application Priority Data
Nov. 9, 2017 (KR) .......................... 10-2017-0148922

(51) Int. Cl.
*D06F 39/08* (2006.01)
*D06F 37/04* (2006.01)
(Continued)

(52) U.S. Cl.
CPC ............ *D06F 39/006* (2013.01); *D06F 21/10* (2013.01); *D06F 37/04* (2013.01); *D06F 37/266* (2013.01);
(Continued)

(58) Field of Classification Search
CPC ...... D06F 37/04; D06F 37/266; D06F 39/083; D06F 39/085; D06F 39/088
See application file for complete search history.

(56) References Cited

U.S. PATENT DOCUMENTS

2009/0249840 A1 10/2009 Jo et al.
2010/0181757 A1* 7/2010 Rosch ................. F16L 55/0337
285/200
(Continued)

FOREIGN PATENT DOCUMENTS

CN 102121186 7/2011
CN 103774381 5/2014
(Continued)

OTHER PUBLICATIONS

Machine English Translation of Description of JP 2011-250920 A (Mikio et al., Dec. 2011) (Year: 2011).*
(Continued)

*Primary Examiner* — Joseph L. Perrin
*Assistant Examiner* — Irina Graf
(74) *Attorney, Agent, or Firm* — Fish & Richardson P.C.

(57) ABSTRACT

A washing machine includes a casing having an input port which is formed in a front surface thereof and to which laundry is inputted; a tub which is disposed in the casing to contain fluid, and has an opening communicating with the input port; a drum which is rotatably disposed in the tub, and contains the laundry; a pump which pumps water discharged from the tub; a circulation conduit which guides the water pumped by the pump; an annular gasket which forms a channel connecting the input port and the opening of the tub, and has a plurality of nozzles for spraying water into the drum on an inner circumferential surface defining the channel; and a nozzle water supply conduit which is fixed to the gasket, and supplies the water pumped by the pump to the plurality of nozzles.

20 Claims, 11 Drawing Sheets

(51) Int. Cl.
  *D06F 39/00* (2020.01)
  *D06F 37/26* (2006.01)
  *D06F 21/10* (2006.01)

(52) U.S. Cl.
  CPC .......... *D06F 39/083* (2013.01); *D06F 39/085* (2013.01); *D06F 39/088* (2013.01)

(56) References Cited

U.S. PATENT DOCUMENTS

| | | | | |
|---|---|---|---|---|
| 2011/0083477 | A1* | 4/2011 | Kim | D06F 37/266 68/140 |
| 2011/0265525 | A1* | 11/2011 | Gweon | D06F 39/088 68/200 |
| 2014/0033449 | A1* | 2/2014 | Im | D06F 37/266 8/137 |
| 2014/0096572 | A1* | 4/2014 | Kim | D06F 31/00 68/17 R |
| 2017/0096769 | A1* | 4/2017 | Kim | D06F 33/00 |

FOREIGN PATENT DOCUMENTS

| | | | |
|---|---|---|---|
| EP | 2719814 | | 4/2014 |
| JP | 2006239142 | | 9/2006 |
| JP | 2011250920 | | 12/2011 |
| KR | 1020070090638 | | 9/2007 |
| WO | WO2011046363 | | 4/2011 |
| WO | WO2014037840 | | 3/2014 |
| WO | WO-2016162235 A1 * | 10/2016 | ........... D06F 39/083 |

OTHER PUBLICATIONS

Australian Office Action in Australian Application No. 2018260955, dated Apr. 24, 2019, 4 pages.
Extended European Search Report in European Application No. 18205356.1, dated Mar. 19, 2019, 8 pages.
Chinese Office Action in Chinese Appln. No. 201811328961.X, dated Mar. 31, 2021, 15 pages (with English translation).
United States Office Action in U.S. Appl. No. 16/186,218, dated Feb. 3, 2021,.

* cited by examiner

WASHING MACHINE HAVING CIRCULATION NOZZLES

CROSS-REFERENCE TO RELATED APPLICATION

This application claims the priority benefit of Korean Patent Application No. 10-2017-0148922, filed on Nov. 9, 2017 in the Korean Intellectual Property Office, the disclosure of which is incorporated herein by reference.

BACKGROUND OF THE INVENTION

1. Field of the Invention

The present invention relates to a washing machine, and more particularly, to a washing machine having a nozzle that discharges water circulated along a nozzle water supply conduit discharged from a tub into a drum.

2. Description of the Related Art

Generally, a washing machine is an apparatus that separates contaminants from clothing, bedding, etc. (hereinafter, referred to as "laundry") by using physical action such as chemical decomposition of water and detergent and friction between water and laundry.

Such a washing machine includes a tub containing water and a drum rotatably installed in the tub to accommodate the laundry. A recent washing machine is configured to circulate water discharged from the tub by using a circulation pump and to spray the circulated water (hereinafter referred to as "circulating water") into the drum through a nozzle.

Korean Patent Publication No. KR20100106260A (hereinafter, referred to as '260 patent) discloses a washing machine having two circulation nozzles on a gasket. Two water conduits are provided in correspondence with the two circulation nozzles. That is, the '260 patent discloses a structure in which a plurality of circulation nozzles are provided and a single circulation nozzle is connected to a single water supply conduit (i.e., a structure in which circulating water is supplied to the circulation nozzles by using the same number of water supply conduits as the number of circulation nozzles). Such a structure has a problem in that the number of the water supply conduits is also increased as the number of the circulation nozzles is increased so that a flow path structure is complicated.

Japan Patent Registration No. JP5671687B (hereinafter, referred to as '687 patent) discloses a structure in which a plurality of circulation nozzles are formed in a tub. Circulating water is guided along a single common flow path (nozzle water path) so that a flow path configuration is simplified, but the circulation nozzle and the nozzle water path are provided in a rear surface of a front portion (front portion where an opening is formed) of the tub (water tank 2). Such a structure is difficult to apply to a washing machine having a narrow gap between the tub and the drum.

In addition, in the '687 patent, a nozzle water path formed as a separate component from the tub is coupled to the rear surface of the front portion of the tub to form a flow path between the rear surface of the front portion and the nozzle water path. In this case, there is a hygienic problem in that a foreign matter is caught in a gap between the rear surface of the front portion and the nozzle water path.

In addition, in the '687 patent, since the nozzle water path is disposed in the tub, in order to connect a pump disposed outside the tub to the nozzle water path through a circulation water path, it is inevitably necessary to perforate the tub so that the circulation water path can pass through the tub. In this case, it is necessary to thoroughly seal a space between a perforated hole and the circulation water path. However, considering that the tub is a vibrating body, it is difficult to maintain such a sealed state for a long time, which may adversely affect the durability of a product.

Korean Patent Publication No. KR20040012600A (hereinafter, referred to as '600 patent) discloses a structure in which an annular flow path is formed on a rear surface of a door, and water supplied through the flow path is sprayed into the drum through a plurality of nozzles. The annular flow path is not for spraying the water circulated by the pump but for spraying the raw water supplied through a water supply flow path into the drum.

Although it is possible to consider connecting the annular flow path of the '600 patent to the circulation pump, in this case, when the door is closed, the annular flow path should be connected to the pump through the flow path, but when the door is opened, the flow path should be separated. That is, the flow path connecting the annular flow path and the pump should be connected/disconnected according to the opening/closing operation of the door. However, in this case, it is difficult to water-tighten a coupling part in which the flow path is connected/disconnected in a closed state of the door.

SUMMARY OF THE INVENTION

A first object of the present invention is to provide a washing machine provided with a nozzle water supply conduit, formed in a gasket, for supplying circulation water to four or more nozzles provided on an inner circumferential surface of the gasket. In particular, the nozzle water supply conduit includes a first conduit portion and a second conduit portion branched into both sides from the circulation conduit connecting port connected to a circulation conduit for guiding water pumped by a pump. At least two of the four or more nozzles are supplied with circulating water through the first conduit portion, and at least other two are supplied with circulating water through the second conduit portion. Since the two or more nozzles are supplied with water through one common conduit portion. Since two or more nozzles are supplied with water through a single common conduit portion, the structure of a flow path is simple in comparison with a case where a plurality of nozzles are supplied with water through a plurality of conduits (flow paths).

Another object of the present invention is to dispose the first conduit portion and the second conduit portion in the outside of the gasket, thereby preventing the outer surface of the first conduit portion or the second conduit portion from being contaminated due to the detergent water applied to the tub or the drum, and improving hygiene.

A further object of the present invention is to provide a method of supplying circulating water from the first and second conduit portions positioned outside the gasket to the nozzles positioned on the inner circumferential surface of the gasket. A plurality of nozzle water supply ports are formed in the first conduit portion and the second conduit portion, a plurality of hollows are formed in the gasket in the thickness direction of the gasket so as to communicate with the plurality of nozzles, and the plurality of nozzle water supply ports are inserted into the plurality of hollows respectively, so that the circulation water can be supplied to the plurality of nozzles from the plurality of nozzle water supply ports A further object of the present invention is to provide a washing machine in which the nozzle water conduit is not easily detached from the gasket. The first conduit portion and the second conduit portion are extended in the opposite direction from the circulation conduit connecting port, while extending along the circumference of the gasket upwardly. The first conduit portion and the second conduit portion form a Y-shape, and the portions divided into both sides enclose the outer circumferential surface of the gasket. In this state, since the nozzle water supply ports protruded from the first conduit portion and the second conduit portion are inserted into the gasket from the outside, when the nozzle water supply port formed in either one of the first conduit portion and the second conduit portion is attempted to be separated from the port insertion conduit of the gasket, the nozzle water supply port formed in the other side moves in the opposite direction and enters the port insertion conduit deeper so that the coupling with the gasket is further tightened, thereby preventing the nozzle water supply conduit from being detached from the gasket. In particular, even when the soft gasket is distorted, the nozzle water supply conduit is not easily detached.

Further, the portion of the Y-shaped structure that is branched from the circulation conduit connecting port to the first conduit portion and the second conduit portion is formed to be relatively soft with respect to the soft circulation conduit (a configuration which connects the pump and the circulation water connection port), and the deformation due to the external force (e.g. the vibration of the tub) lower than the force causing the plastic deformation (permanent deformation) is restored to its original state. Thus, the deformation (the first conduit portion and the second conduit portion are separated) and the restoration (the first conduit portion and the second conduit portion are returned to the original shape) are repeated during the vibration process of the tub. Hence, the gasket is not easily detached from the gasket.

A further object of the present invention is to provide the first conduit portion and the second conduit portion constituting the nozzle water supply conduit between a balancing weight and the gasket. Even when the gasket is vibrated or deformed so that the first conduit portion and the second conduit portion are to be separated from the gasket, the balancing weight is brought into contact with the first conduit portion and/or the second conduit portion from the outside to prevent the nozzle water supply conduit from being detached. A pair of the balancing weight may be provided in correspondence with the first conduit portion and the second conduit portion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
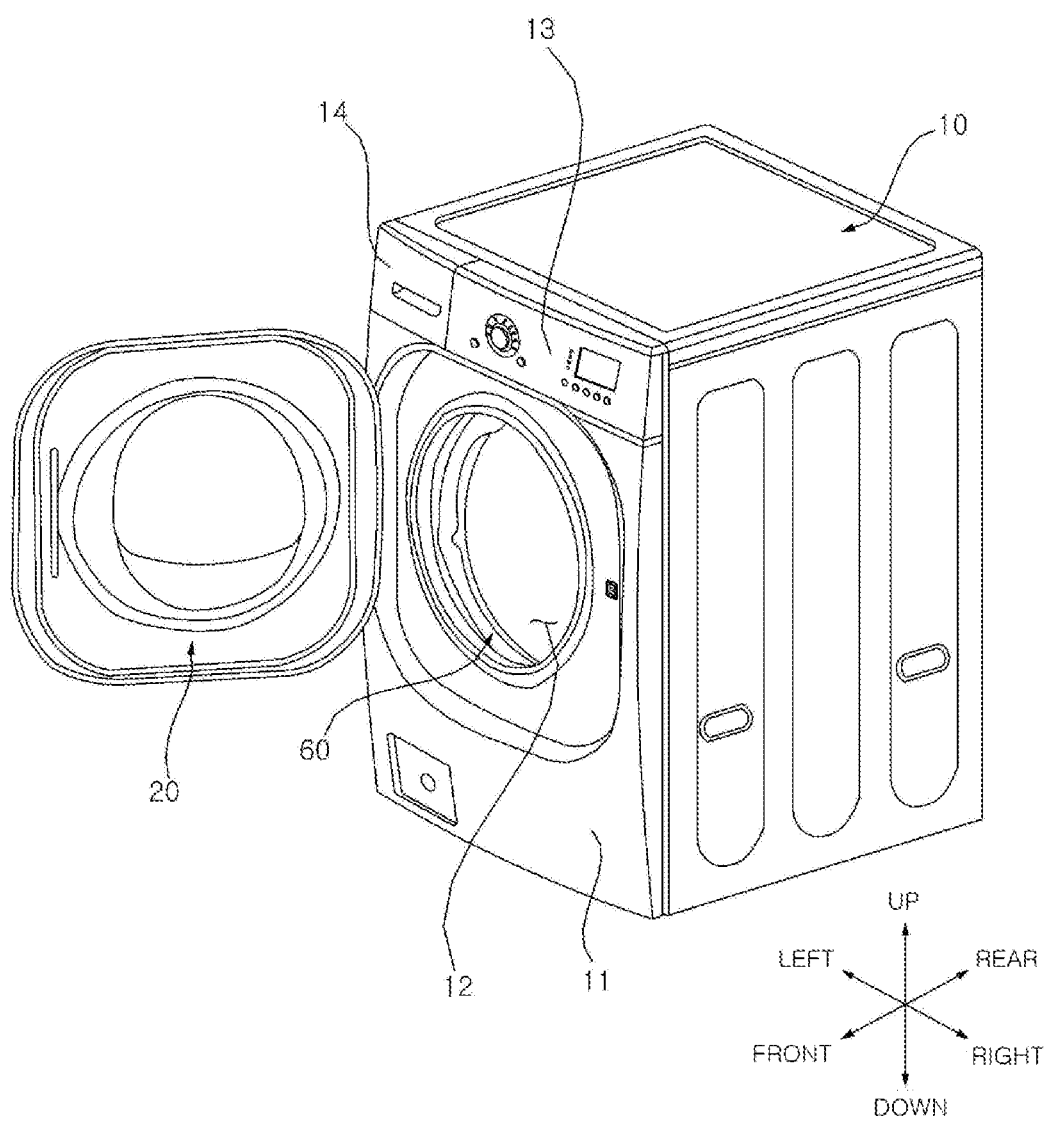
FIG. 1 is a perspective view of a washing machine according to an embodiment of the present invention.

Advantages and features of the present invention and methods for achieving them will be made clear from the embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is defined only by the scope of the claims. Like reference numerals refer to like elements throughout the specification.

Figure 2:
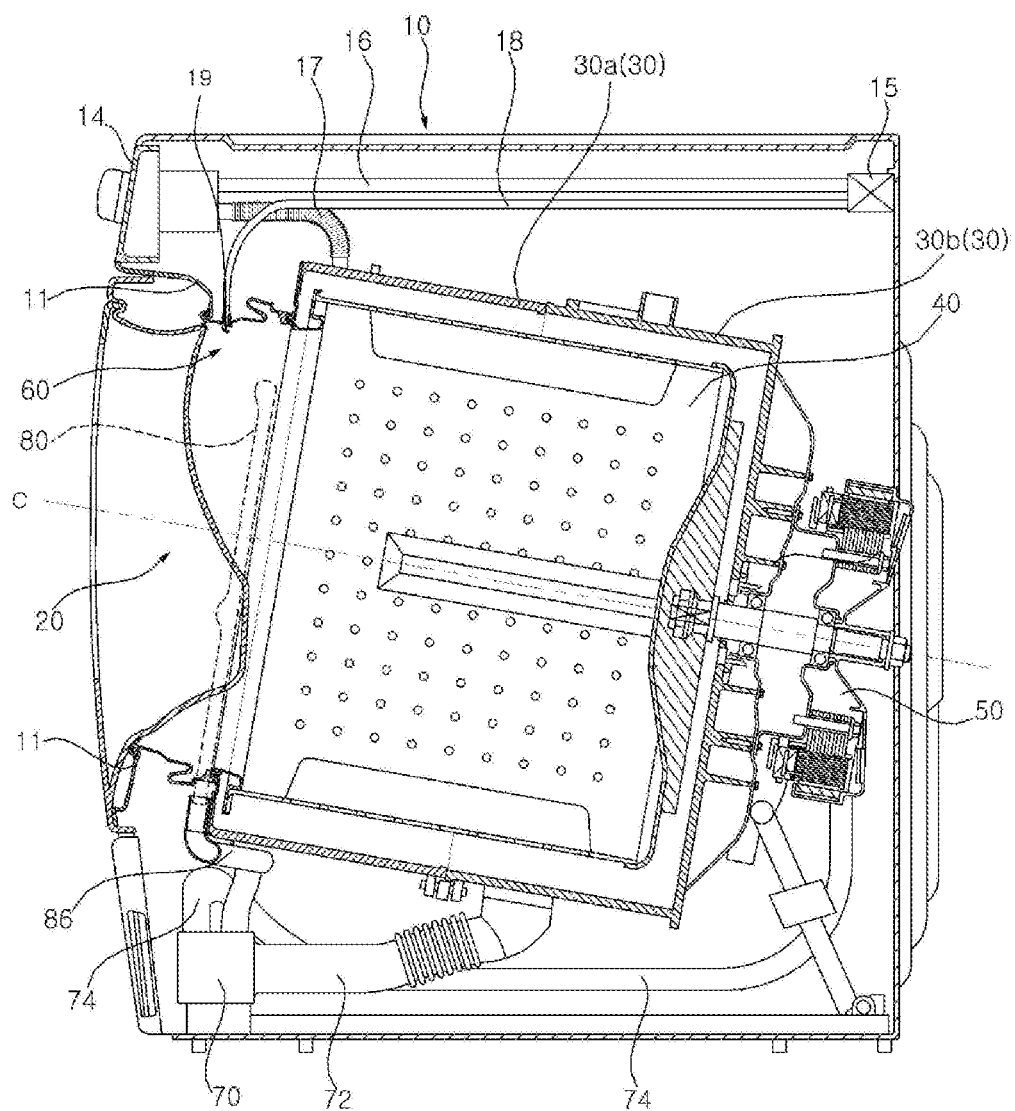
FIG. 2 is a side sectional view of the washing machine shown in FIG. 1.
Figure 3:
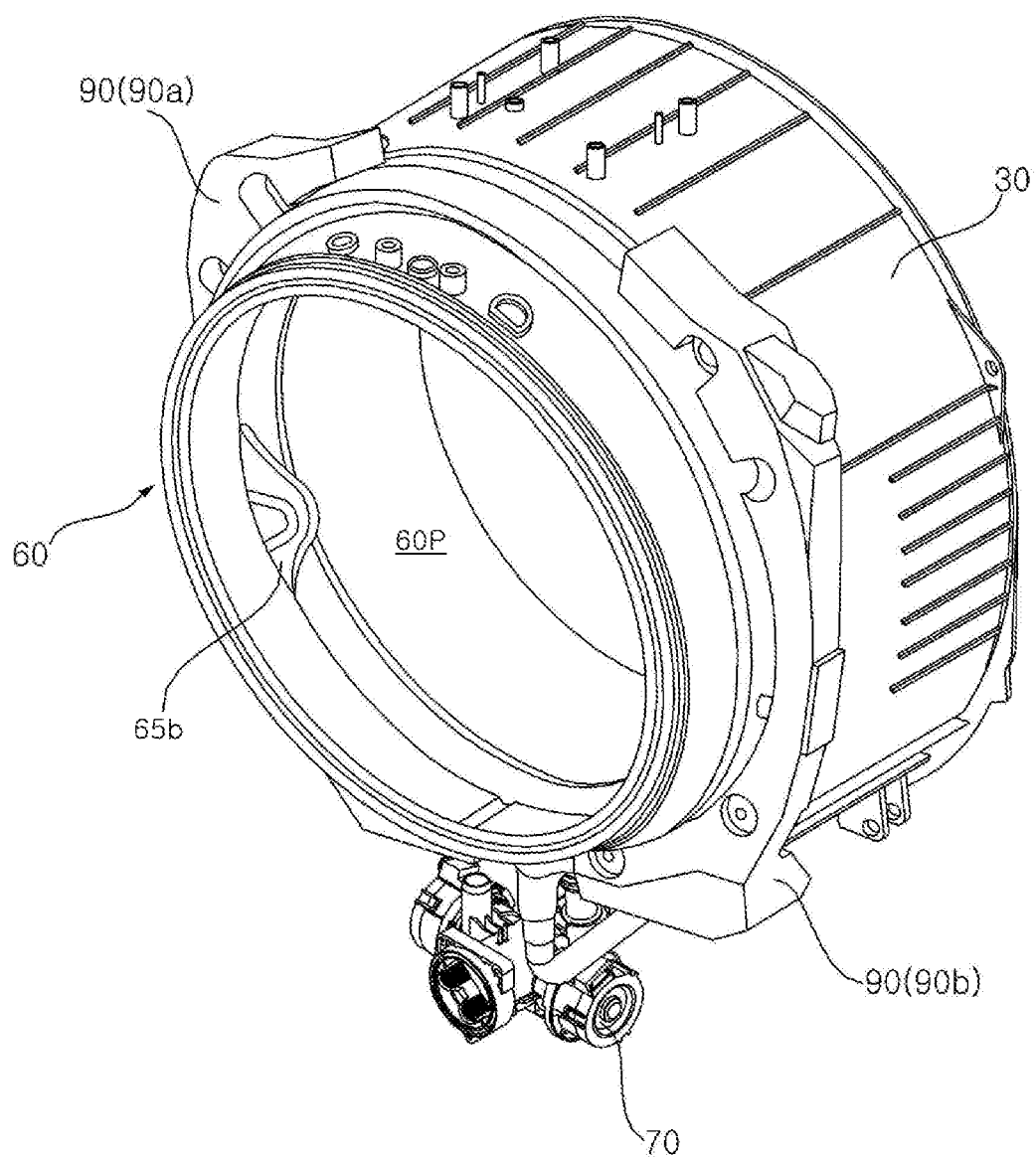
FIG. 3 is a partial perspective view showing a part of the washing machine shown in FIG. 1.
Figure 4:
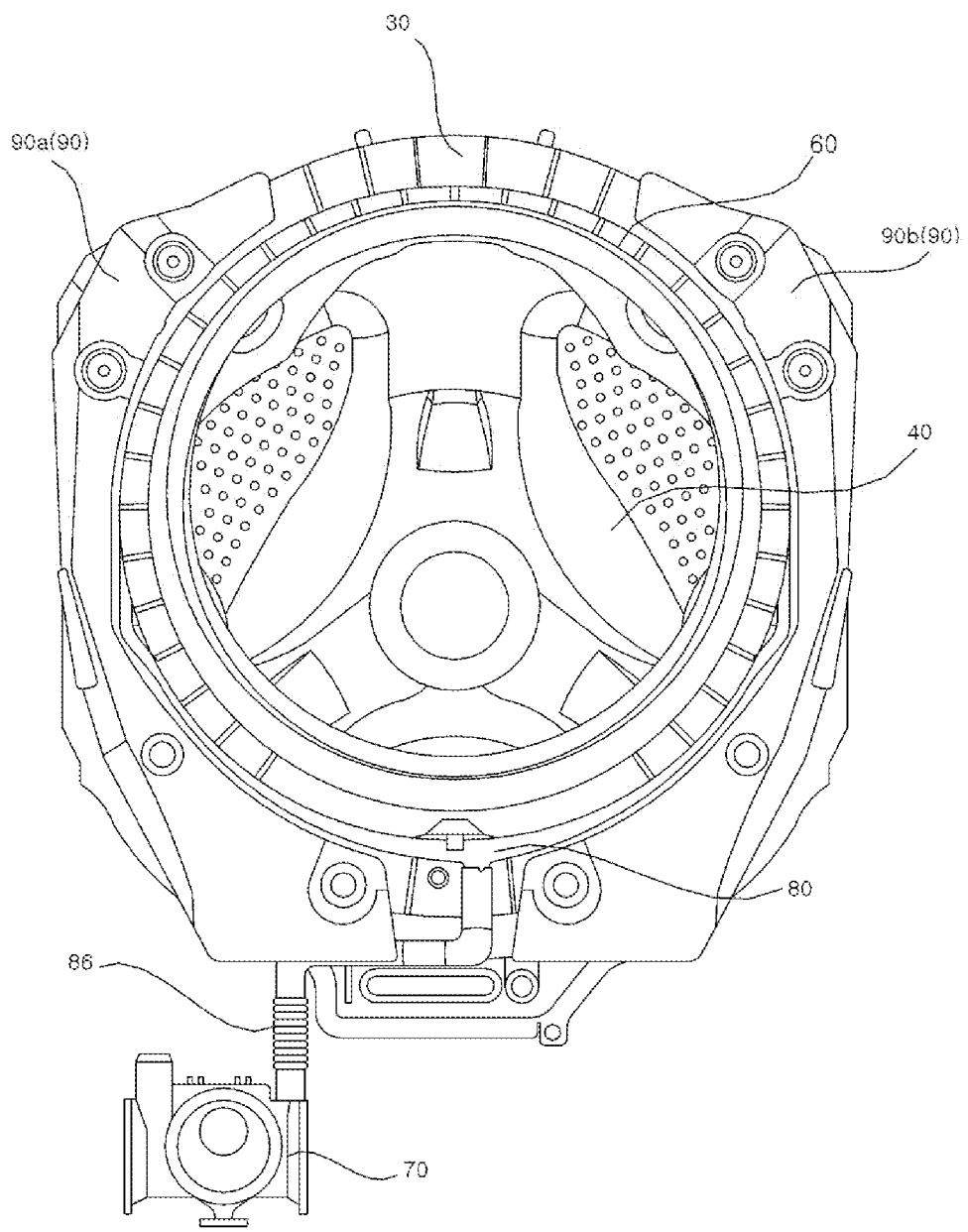
FIG. 4 is a front view of an assembly shown in FIG. 3.
Figure 5:
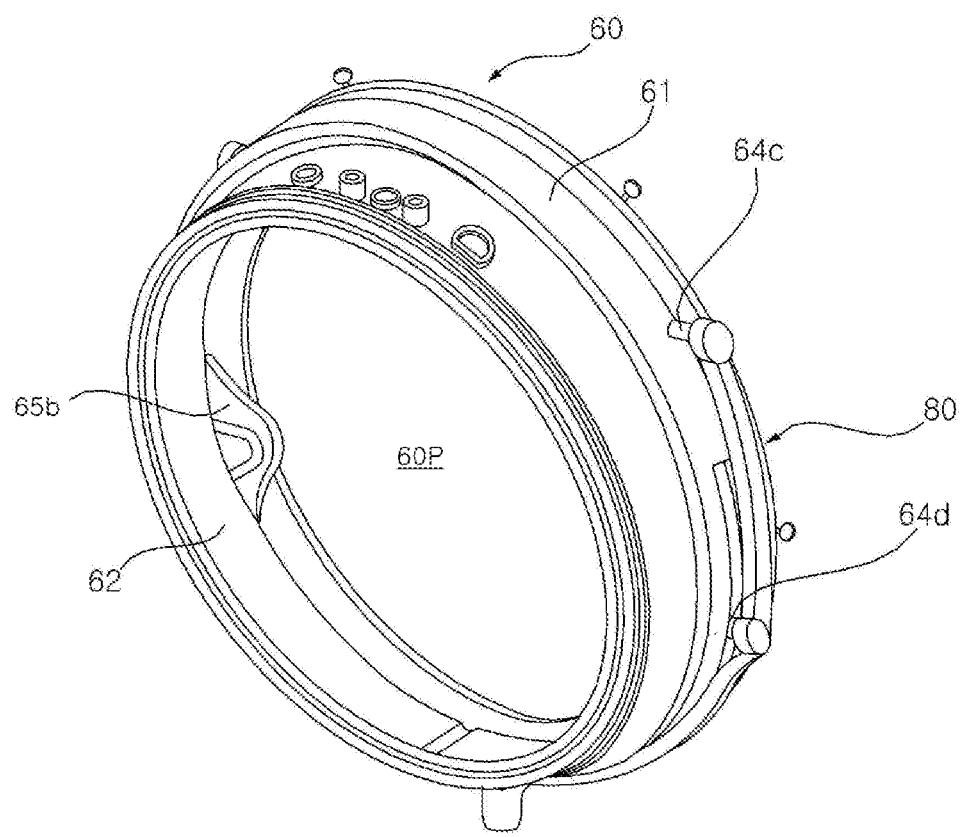
FIG. 5 is a perspective view showing a nozzle water supply conduit installed in a gasket.
Figure 6:
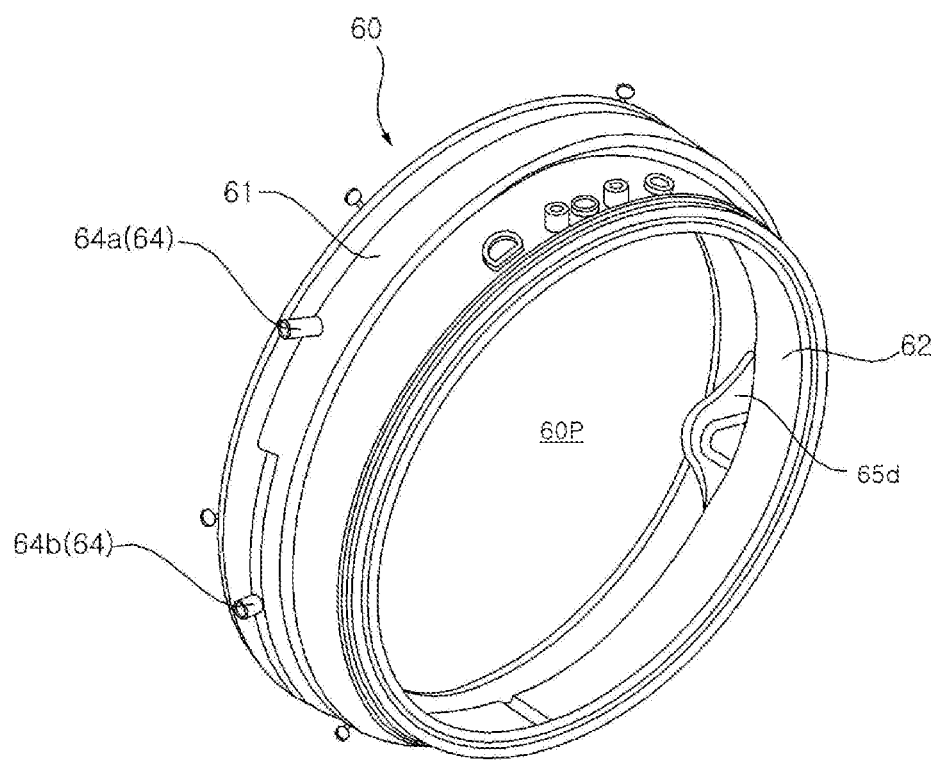
FIG. 6 is a view of the gasket shown in FIG. 5 from a different angle.
Figure 7:
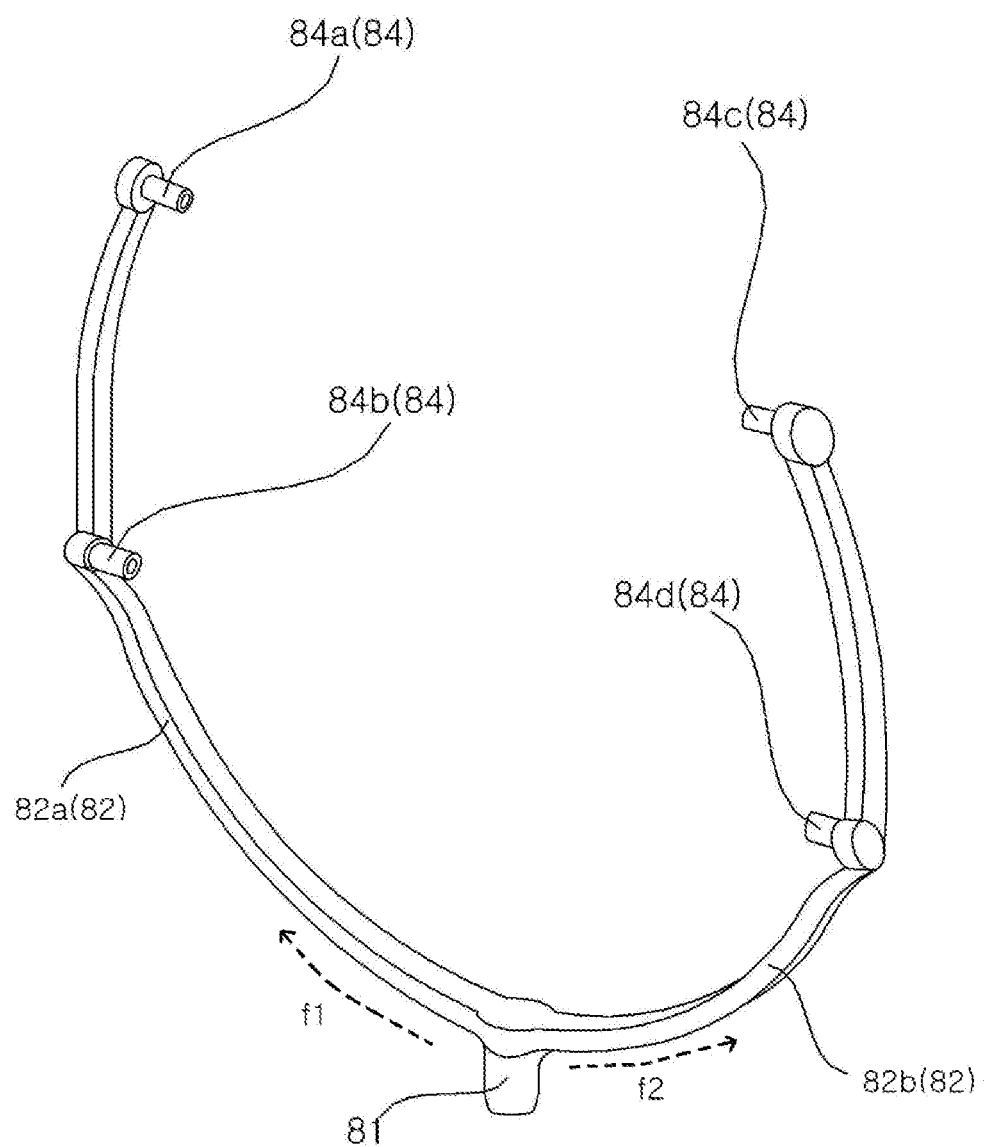
FIG. 7 is a perspective view of a nozzle water supply conduit.
Figure 8:
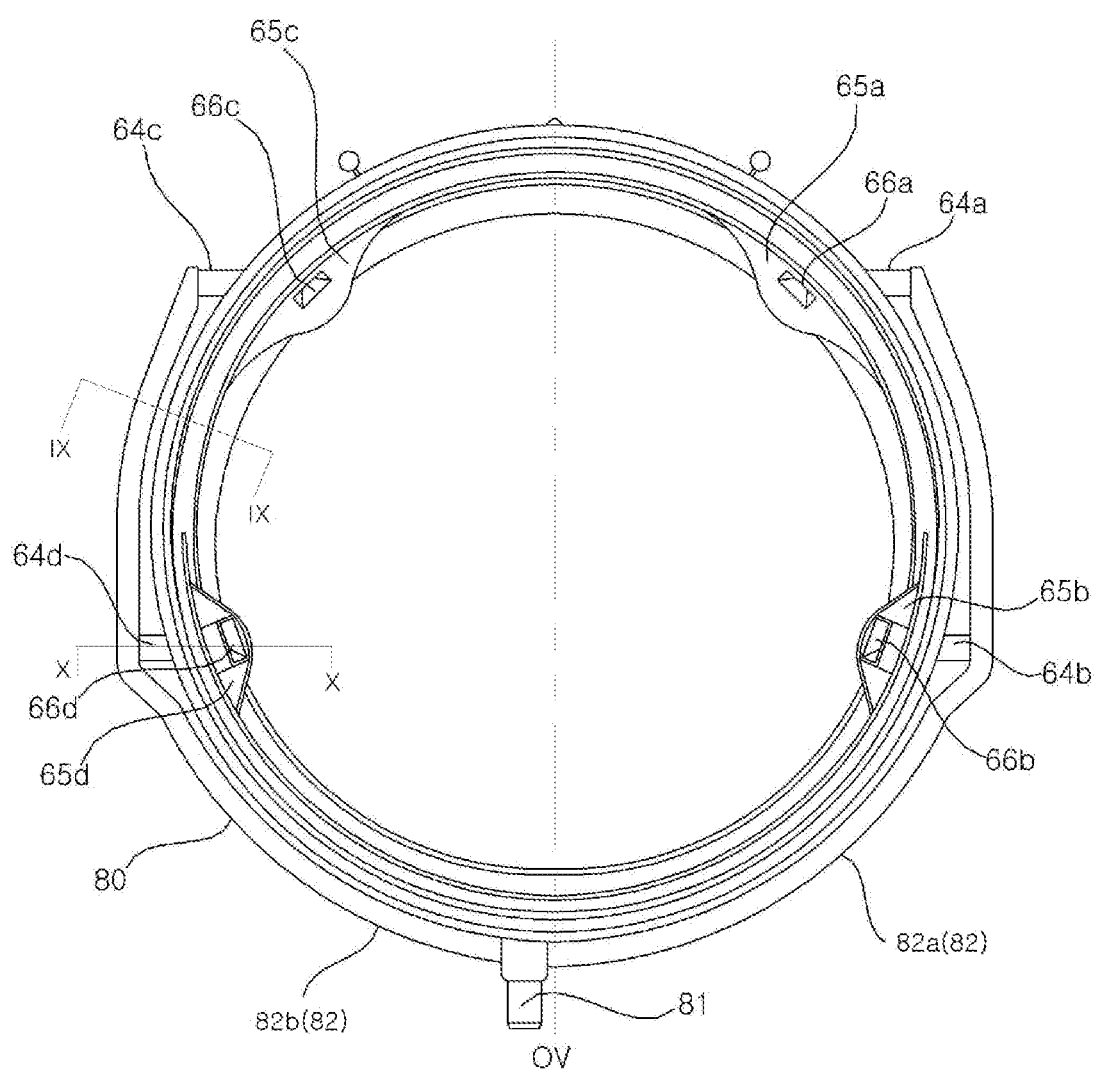
FIG. 8 is a rear view of a state in which a nozzle water supply conduit is installed in the gasket.
Figure 9:
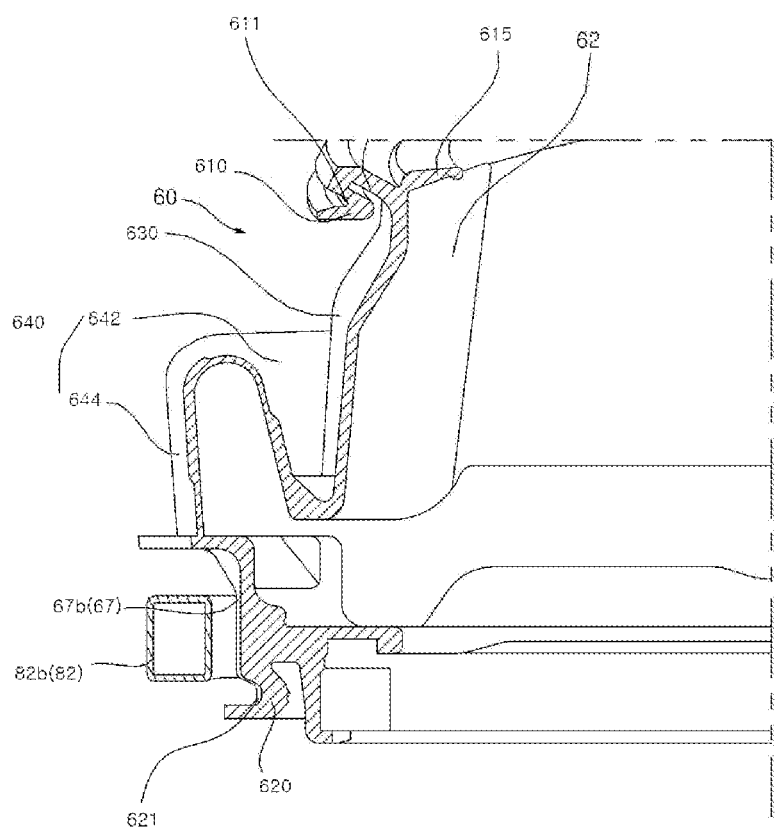
FIG. 9 is a cross-sectional view taken along a line IX-IX of FIG. 8.
Figure 10:
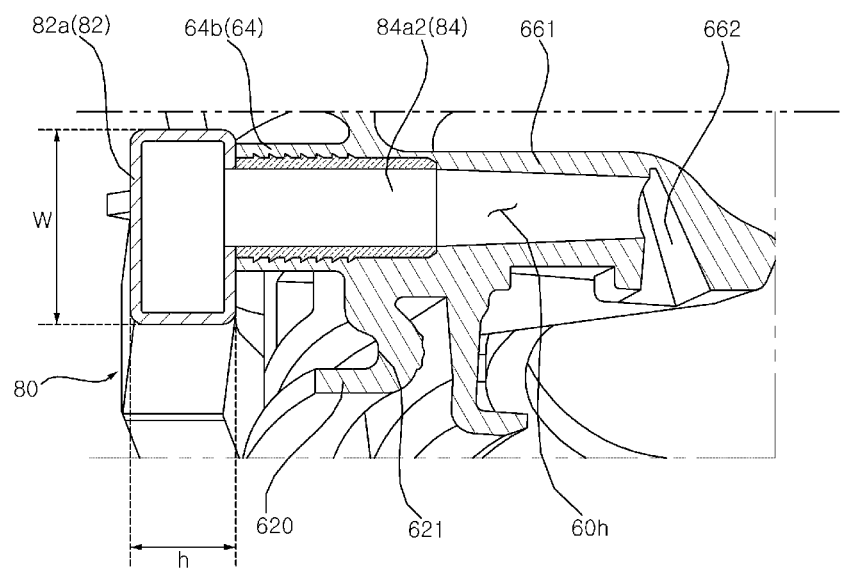
FIG. 10 is a cross-sectional view taken along a line X-X of FIG. 8.

FIG. 1 is a perspective view of a washing machine according to an embodiment of the present invention. FIG. 2 is a side sectional view of the washing machine shown in FIG. 1. FIG. 3 is a partial perspective view showing a part of the washing machine shown in FIG. 1. FIG. 4 is a front view of an assembly shown in FIG. 3. FIG. 5 is a perspective view showing a nozzle water supply conduit installed in a gasket. FIG. 6 is a view of the gasket shown in FIG. 5 from a different angle. FIG. 7 is a perspective view of a nozzle water supply conduit. FIG. 8 is a rear view of a state in which a nozzle water supply conduit is installed in the gasket. FIG. 9 is a cross-sectional view taken along a line IX-IX of FIG. 8. FIG. 10 is a cross-sectional view taken along a line X-X of FIG. 8.

Referring to FIG. 1 and FIG. 2, a washing machine according to an embodiment of the present invention includes a casing 10 which forms an outer appearance, a tub 30 which is disposed in the casing 10 and stores fluid, a drum 40 which is rotatably installed in the tub 30 and into which laundry is inputted, and a motor 50 which rotates the drum 40.

A front panel 11 provided with an input port 12 is disposed on a front surface of the casing 10, and, on the front panel 11, a door 20 for opening and closing the input port 12 is disposed and a dispenser 14 into which detergent is dispensed may be installed. The casing 10 may be provided with a control panel 13 for receiving a command for operating the washing machine.

A water supply valve 15, a water supply conduit 16, and a water supply hose 17 may be installed in the casing 10. The fluid that passed through the water supply valve 15 and the water supply conduit 16 during water supply may be mixed with the detergent in the dispenser 14, and then supplied to the tub 30 through the water supply hose 17.

Meanwhile, a direct water supply conduit 18 is connected to the water supply valve 15 so that the fluid can be directly supplied into the tub 30 through the direct water supply conduit 18 without being mixed with the detergent. A direct water nozzle 19 for spraying the water supplied through the direct water supply conduit 18 into the drum 40 may be provided.

At least one nozzle water supply conduit 80 for guiding water pumped by a pump 70 is provided. The pump 70 is connected to the tub 30 through a discharge hose 72, and the nozzle supply conduit 80 and the pump 70 may be connected directly or through a circulation conduit 86.

The circulation conduit 86 may be made of an amorphous soft material. That is, the circulation conduit 86 can be deformed by an external force and may be made of rubber or soft synthetic resin (or deformable material).

The nozzle water supply conduit 80 may include a circulation conduit connecting port 81 through which water discharged from the pump 70 flows into, a transfer conduit 82 which guides water introduced through the circulation conduit connecting port 81, and a plurality of nozzle water supply ports 83, 84 branched from the transfer conduit 82.

The nozzle water supply conduit 80 is fixed to a gasket 60. In some cases, it is not possible to spray water into the drum 40 even when a nozzle is installed in the tub 40 due to various structural reasons such as a case where, in particular, the front end (i.e., the opening of the drum 40) of the drum 40 is located close to the opening of the tub 30 (e.g., a structure in which the opening of the drum 40 is located in the same plane as the opening of the tub 30, or protrudes forward through the opening of the tub 30), and further, the opening of the drum 40 is located inside the opening of the tub 30 when viewed from the front. Therefore, it is preferable that the nozzle 66a, 66b, 66c, and 66d is formed in the gasket 60 which does not have an obstacle to the spraying of water into the drum 40, and the nozzle water supply conduit 80 for supplying water to the nozzle is also installed in the gasket 60.

The pump 70 may be located below the tub 30. The pump may be fixed on a base 101 forming the bottom of the casing 10. The pump 70 may include a pump casing which forms a chamber into which water discharged through the discharge hose 72 is introduced from the tub 30, an impeller which is rotatably installed in the pump casing, and a pump motor which rotates the impeller. In the pump casing, an input port connected to the discharge hose 72 is communicated with the chamber, and a circulation port and a drain port that discharge water pumped by the impeller may be formed. The circulation port may be connected to the circulation conduit 86, and the drain port may be connected to a discharge conduit 74.

The water in the chamber may be selectively supplied to the circulation port or the drain port according to the rotation direction of the impeller. That is, when the impeller rotates in the forward direction, the fluid is discharged through the circulation port, and when the impeller rotates in the reverse direction, the fluid may be discharged through the drain port. Since a method of implementing circulation or drain of water according to the rotation direction of the impeller while using a single pump is well known, a further explanation will be omitted.

The pump motor may be a variable speed motor capable of controlling the rotation speed and may be a brushless direct current motor (BLDC) motor. Obviously, the rotation direction of the BLDC motor can also be controlled.

The above described pump 70 serves as a circulation pump circulating the fluid and a drain pump discharging the fluid to the outside. Alternatively, the circulation pump and the drain pump may be separately provided. When the circulation pump and the drain pump are separately provided, it is obvious that the drain conduit 74 is connected to the drain pump and the circulation conduit 86 is connected to the circulation pump.

Meanwhile, the tub 30 may be formed as a single tub body, or may be formed by fastening first and second tub bodies 30a and 30b to each other. In an embodiment of the present invention, it is illustrated that the first and second tub bodies 30a and 30b are fastened to form the tub 30. Hereinafter, the first tub body 30a will be referred to simply as a 'tub 30'.

An opening part 32 is formed in the front surface 32 of the tub 30 so as to correspond to the input port 12 formed in the front panel 11 forming the front surface of the casing 10. The gasket 60 is disposed between the rim of the input port 12 of the front panel 11 and the rim of the tub 30 forming the opening part 32. The gasket 60 is formed of a flexible material such as rubber and has a substantially cylindrical shape.

The front edge of the gasket 60 is connected to the rim of the input port 12 of the front panel 11, and the rear edge of the gasket 60 is connected to the rim of the opening part of the tub 30 so that a gap between the tub 30 and the front panel 11 is sealed. When the door 20 is closed, the door 20 and the front end of the gasket 60 come into close contact with each other and a gap between the door 20 and the gasket 60 is sealed so that the leakage of the fluid is prevented.

In more detail, referring to FIG. 9 and FIG. 10, the gasket 60 may include a casing coupling portion 610 coupled to circumference of the input port 12 of the casing 10, a tub coupling portion 610 coupled to circumference of the opening of the tub 30, and an extension portion 650 extended from between the casing coupling portion 610 and the tub coupling portion 620.

Each of the casing coupling portion 610 and the tub coupling portion 620 is formed in an annular shape. The extension portion 650 may have an annular rear end portion connected to the tub coupling portion 620 from an annular front end portion connected to the casing coupling portion 610, and may be formed in a tubular shape extended from the front end to the rear end.

In the front panel 11 of the casing 10, the circumference of the input port 12 is curled outward, and the casing coupling portion 610 may be fitted in a concave portion formed by the curled portion.

An annular groove 611 through which a wire is wound may be formed in the casing coupling portion 610. After the wire is wound along the groove 611, the both ends of the wire are bounded so that the casing coupling portion 610 is firmly fixed to the circumference of the input port 12.

The circumference of the opening of the tub 30 is curled outward, and the tub coupling portion 620 is fitted into a concave portion formed by the curled portion. An annular groove 621 through which a wire is wound may be formed in the tub coupling portion 620. After the wire is wound along the groove 621, the both ends of the wire are bounded so that the tub coupling portion 620 is firmly coupled to the circumference of the opening of the tub 30.

Meanwhile, the casing coupling portion 610 is fixed to the front panel 11, but the tub coupling portion 620 is displaced according to the movement of the tub 30. Therefore, the extension portion 650 should be deformable in response to the displacement of the tub coupling portion 620. In order to facilitate such deformation, in the gasket 60, a folded portion 640 which is folded as the tub 30 is moved in the direction (or radial direction) in which the tub 30 is moved by the eccentricity may be formed in a section (or an extension portion 650) between the casing coupling portion 610 and the tub coupling portion 620.

Specifically, the extension portion 650 may include a cylindrical rim portion 630 extended rearward from the casing coupling portion 610, and the folded portion 640 formed between the rim portion 630 and the tub coupling portion 620.

The gasket 60 may further include a door close portion 615 which is bent inward from the front end of the rim portion 630 and brought into close contact with the rear surface of the door 20 in the inside of the input port 12 in a state in which the door 20 is closed.

Meanwhile, the drum 40 is vibrated (i.e., the rotation center line C (see FIG. 2) of the drum 40 is moved) during a rotation process, and thus, the center line (approximately, the same as the rotation center line C of the drum 40) of the tub 30 is also moved. At this time, the moving direction (hereinafter, referred to as "eccentric direction") has a radial component.

The folded portion 640 is folded or unfolded when the tub 30 moves in the eccentric direction. The folded portion 640 may include an inner diameter portion 642 which is bent from the rim portion 630 toward the casing coupling portion 610 and an outer diameter portion 644 which is bent from the inner diameter portion 642 toward the tub coupling portion 620, and coupled to tub coupling portion 620. When the center of the tub 30 is moved in the eccentric direction, if a part of the folded portion 640 is folded, a gap between the inner diameter portion 642 and the outer diameter portion 644 is reduced at a folded portion, whereas the gap between the inner diameter portion 642 and the outer diameter portion 644 is increased at the other portion where the folded portion 640 is unfolded.

A first seating groove 67a and a second seating groove 67b extended along the circumferential direction may be formed on an outer circumferential surface 61 of the gasket 60. The first seating groove 67a and the second seating groove 67b are formed in both sides of a passage 60p of the gasket 60, and are preferably symmetrical. At least a part of a first conduit portion 82a may be seated in the first seating groove 67a and at least a part of a second conduit portion 82b may be seated in the second seating groove 67b.

Referring to FIG. 10, the cross-section of at least one of the first conduit portion 82a and the second conduit portion 82b may have a shape in which the height h defined in the radial direction of the gasket 60 is smaller than the width w defined in the longitudinal direction of the passage 60P of the gasket 60.

The first seating groove 67a and the second seating groove 67b may be formed in the outer diameter portion 644 of the gasket 60. The deformation of the gasket 60 in the folded portion 640 is mainly accomplished at a portion where the inner diameter portion 642 and the outer diameter portion 644 meet. Even if the vibration of the tub 30 occurs, the outer diameter portion 644 mainly performs translation motion, but it is not easily deformed (e.g., distorted) and maintains a stable shape.

Therefore, by forming the first and second seating grooves 67a and 67b in the outer diameter portion 644, even if the vibration of the tub 30 is generated, the shape of the first and second seating grooves 67a and 67b can be maintained, and thus, the first conduit portion 82a and the second conduit portion 82b can be stably retained.

At least one balancing weight 90 may be fastened to the front surface 32 of the tub 30. The balancing weight 90 is fixed to the tub 30, and may be disposed in both sides of the opening of the tub 30 respectively. A first balancing weight 90a may be disposed in the left side of a front surface 31, and a second balancing weight 90b may be disposed in the right side of the front surface 31. The first conduit portion 82a may be disposed between the gasket and the first balancing weight 90a. The second conduit portion 82b may be disposed between the gasket 60 and the second balancing weight 90b.

The circulation conduit connecting port 81 may be disposed between the first balancing weight 90a and the second balancing weight 90b. Specifically, the lower end of the first balancing weight 90a and the lower end of the second balancing weight 90b are spaced apart in the left-right direction, and the circulation conduit connecting port extends downward from the transfer conduit 82 to reach within a spaced distance. In the structure in which the balancing weights 90a and 90b are disposed in both sides, the circulation conduit connecting port 81 and the circulation conduit 86 may be connected to each other by using the spaced distance. The circulation conduit connecting port 81 may be located such that an inlet which is connected to the circulation conduit 86 is located below an outlet which discharges water to the first conduit portion 82a and the second conduit portion 82b.

The nozzle water supply conduit 80 includes the circulation conduit connecting port 81, the transfer conduit 82, a plurality of first nozzle water supply ports 84a and 84b, and a plurality of second nozzle water supply ports 84c and 84d. The circulation conduit connecting port 81 is connected to the circulation conduit 86. The circulation conduit connecting port 81 may be located below the tub 30. Preferably, the circulation conduit connecting port 81 is located below any of the first nozzle water supply ports 84a, 84b, and the second nozzle water supply ports 84c, 84d.

Water discharged from the pump 70 flows into the circulation conduit connecting port 81. The circulation conduit connecting port 81 may be connected to the pump 70 by the circulation conduit 86.

The transfer conduit 82 is disposed in the outer circumference of the gasket 60. The transfer conduit 82 branches the water discharged from the circulation conduit connecting port 81 to a first sub-flow f1 and a second sub-flow f2. The transfer conduit 82 includes a first conduit portion 82a which is branched in a first direction from the circulation conduit connecting port 81 and extends upward along the circumference of the gasket 60 and guides the first sub-flow f1, and a second conduit portion 82b which is branched in a second direction from the circulation conduit connecting port 81 and extends upwardly along the circumference of the gasket 60 from the opposite side of the first duct portion 82a about the gasket 60 and guides the second sub-flow f2.

One ends of the first conduit portion 82a and the second conduit portion 82b are connected to the circulation conduit connecting port 81, and the other ends thereof are closed. The first conduit portion 82a and the second conduit portion 82b are extended from the circulation conduit connecting port 81 to the opposite side (i.e., both left and right sides in the drawing) and extended respectively along the circumference (or, the shape corresponding to the circumference of the gasket 60) of the gasket 60. The other end of the first conduit portion 82a and the other end of the second conduit portion 82b are positioned in the opposite side to each other based on the gasket 60.

In the embodiment, the transfer conduit 82 is formed integrally with the circulation conduit connecting port 81, but is not necessarily limited thereto. The first conduit portion 82a, the second conduit portion 82b, and the circulation conduit connecting port 81 may be molded into a separate part, and then, the first conduit portion 82a and the second conduit portion 82b may be connected (coupled) to both sides of the circulation conduit connecting port 81.

The transfer conduit 82 may be made of hard material in comparison with the circulation conduit 86. The transfer conduit 82 may be made of high-density polyethylene (HDPE) or polypropylene (PP).

Meanwhile, the area of a cross-section of flow path (a cross-section of the path guiding the water) of the transfer path 82 may be gradually reduced from the lower portion of the transfer path 82 to the upper portion. The width of the cross-section of the flow path may be gradually decreased from the lower portion of the transfer path 82 to the upper portion.

Since the cross section of the flow path becomes narrower toward the upper side, the flow velocity may be increased, and the water pressure drop due to the position rise can be compensated by the increase of flow velocity so that the upper nozzle 66a, 66c can uniformly spray water with the same water pressure as the lower nozzle 66b, 66d.

Meanwhile, a first upper nozzle 66a receiving water through the first conduit portion 82a may spray water downward toward the inside of the drum 40, and a first lower nozzle 66b receiving water through the first conduit portion 82a may spray water upward toward the inside of the drum 40.

Similarly, the second upper nozzle 66c, which receives water through the second conduit portion 82b, may spray water downward toward the inside of the drum 40, and the second lower nozzle 66d, which receives water through the second conduit portion 82b, may spray water upward toward the inside of the drum 40.

The lower nozzle 66b, 66d, which is positioned in a relatively low position to achieve a water supply at a high pressure, sprays water upward, and the upper nozzle 66a, 66c, which is positioned in a relatively high position to achieve a water supply at a low pressure, so that the spray pressures of the upper nozzle 66a, 66c and the lower nozzle 66b, 66d can be substantially uniform.

The plurality of nozzle water supply ports 83 and 84 are branched from the transfer conduit 82, respectively. The circulating water (i.e., the water pumped by the pump 70) transferred along the transfer conduit 82 is discharged through the plurality of nozzle water supply ports 83 and 84. These nozzle water supply ports 83 and 84 are branched from the transfer conduit 82 at the upper side of the circulation conduit connecting port 81. That is, the inlet of the nozzle water supply port 83, 84 (i.e., the portion where the nozzle water supply port 83, 84 is connected to the transfer conduit 82) is positioned above the outlet of the circulation conduit connecting port 81 (i.e., the portion where the circulation conduit connecting port 81 is connected to the transfer conduit 82).

Hereinafter, among the plurality of nozzle water supply ports 83 and 84, one formed in the first conduit portion 82a is referred to as a first nozzle water supply port 84a and 84b, and one formed in the second conduit portion 82b is referred to as a second nozzle water supply port 84c and 84d. In the present embodiment, two first nozzle water supply ports 84a and 84b and two second nozzle water supply ports 84c and 84d are provided, but the number of the nozzle water supply ports 84a, 84b, 84c and 84d is not limited thereto.

In addition, according to the embodiment, one nozzle water supply port may be formed in one of the first conduit portion 82a and the second conduit portion 82b, and a plurality of nozzle water supply ports may be formed in the other conduit portion.

In addition, hereinafter, among two nozzle water supply ports 83 and 84 positioned at different heights on one conduit portion 82a, 82b, one positioned in a lower side is referred to as a lower nozzle water supply port 83, and one positioned above the lower nozzle water supply port 83 is referred to as an upper nozzle water supply port 84. In the embodiment, a first upper nozzle water supply port 84a and a first lower nozzle water supply port 84b are formed in the first conduit portion 82a, and a second upper nozzle water supply port 84c and a second lower nozzle water supply port 84d are formed in the second conduit portion 82b.

The transfer conduit 82 is disposed outside the passage 60P defined by the gasket 60, and the nozzle 66a, 66b, 66c and 66d is formed on the inner circumferential surface of the gasket 60 defining the passage 60P. A plurality of hollows 60h are formed in the gasket in the thickness direction of the gasket 60 so as to communicate with the plurality of nozzles 66a, 66b, 66c and 66d, respectively. The circulating water is supplied to the nozzles 66a, 66b, 66c, and 66d by inserting the plurality of nozzle water supply ports 84a, 84b, 84c, and 84d to the plurality of hollows 60h.

Referring to FIG. 10, each of the nozzles 66a, 66b, 66c and 66d includes a nozzle inflow conduit 661 which is protruded from the inner circumferential surface of the gasket 60 and a nozzle head 662 which communicates with the nozzle inflow conduit 661. The nozzle inflow conduit 661 is preferably protruded from the inner circumferential surface of the extension portion 650. More preferably, the nozzle inflow conduit 661 is protruded from the inner circumferential surface of the outer diameter portion 644. Meanwhile, a port insertion conduit 64a, 64b, 64c, and 64d may be protruded from the outer circumferential surface of the outer diameter portion 644. The water discharged from the nozzle water supply port 84a, 84b, 84c and 84d is guided to the nozzle head 662 through the nozzle inflow conduit 661 to be sprayed.

The first to fourth port insertion conduits 64a, 64b, 64c and 64d may be protruded in the outer direction of the gasket 60 on the outer circumferential surface 61 of the gasket 60 so as to correspond to the four nozzle water supply ports 83 and 84 respectively, and the four nozzle water supply ports 83 and 84 may be inserted and connected to the first to fourth port insertion conduits 64a, 64b, 64c and 64d respectively. The port insertion conduits 64a, 64b, 64c and 64d are in communication with the nozzle inflow conduit 661 and define the hollow 60h together with the nozzle inflow conduit 661.

The inner circumferential surface 62 of the gasket 60 is provided with first to fourth nozzles 66a, 66b, 66c, and 66d communicating with the first to fourth port insertion conduits 64a, 64b, 64c, and 64d, respectively. In an embodiment of the present invention, the first to fourth nozzles 66a, 66b, 66c, and 66d are integrally formed with the gasket 60. Alternatively, the nozzles may be formed of a separate component from the gasket 60 and may be connected to the gasket 60, or may be connected to the first to fourth port insertion conduits 64a, 64b, 64c, and 64d through a separate flow path connecting member (not shown) in a state of being separated from the gasket 60.

The nozzles 61a, 66b, 66c, and 66d may be provided in both sides based on the gasket 60, and are, preferably, disposed symmetrically with respect to a vertical plane OV passing through the center of the gasket 60. Hereinafter, when viewed from the front, the nozzle 66a, 66b disposed in the left side with respect to the vertical plane OV is referred to as a first nozzle 66a, 66b, one of the two first nozzles 66a and 66b, which is positioned in a relatively upper side, is referred to as a first upper nozzle 66a, and the other, which is positioned in a lower side, is referred to as a first lower nozzle 66b.

Similarly, the nozzle 66c, 66d disposed in the right side (or a second area) with respect to the vertical plane OV is referred to as a second nozzle 66c, 66d, one of the two second nozzles 66c and 66d, which is positioned in a relatively upper side, is referred to as a second upper nozzle 66c, and the other, which is positioned in a lower side, is referred to as a second lower nozzle 66d.

Based on a vertical plane OV to which the center C of the drum 40 belongs, when dividing the vertical plane into left and right sides to define a first area and a second area, the first upper nozzle 66a may be disposed in the first area to spray water downward toward the second area. In addition, the second upper nozzle 66c may be disposed in the second area to spray water downward toward the first area.

The first lower nozzle 66b may be disposed, below the first and second upper nozzles, in the first area and may spray water upward toward the second area. In addition, the second lower nozzle 66d may be disposed, below the first and second upper nozzles, in the second area to spray water upward toward the first area.

First to fourth protrusions 65a to 65d may protrude from the inner circumferential surface 62 of the gasket 60 toward the inside of the gasket 60, and the first to fourth nozzles 66a, 66b, 66c, and 66d may be formed in the protrusions 65a to 65d respectively. Therefore, the circulating water discharged through the nozzle water supply ports 83 and 84 may be sprayed into the drum 40 through the first to fourth nozzles 66a, 66b, 66c and 66d.

Figure 11:
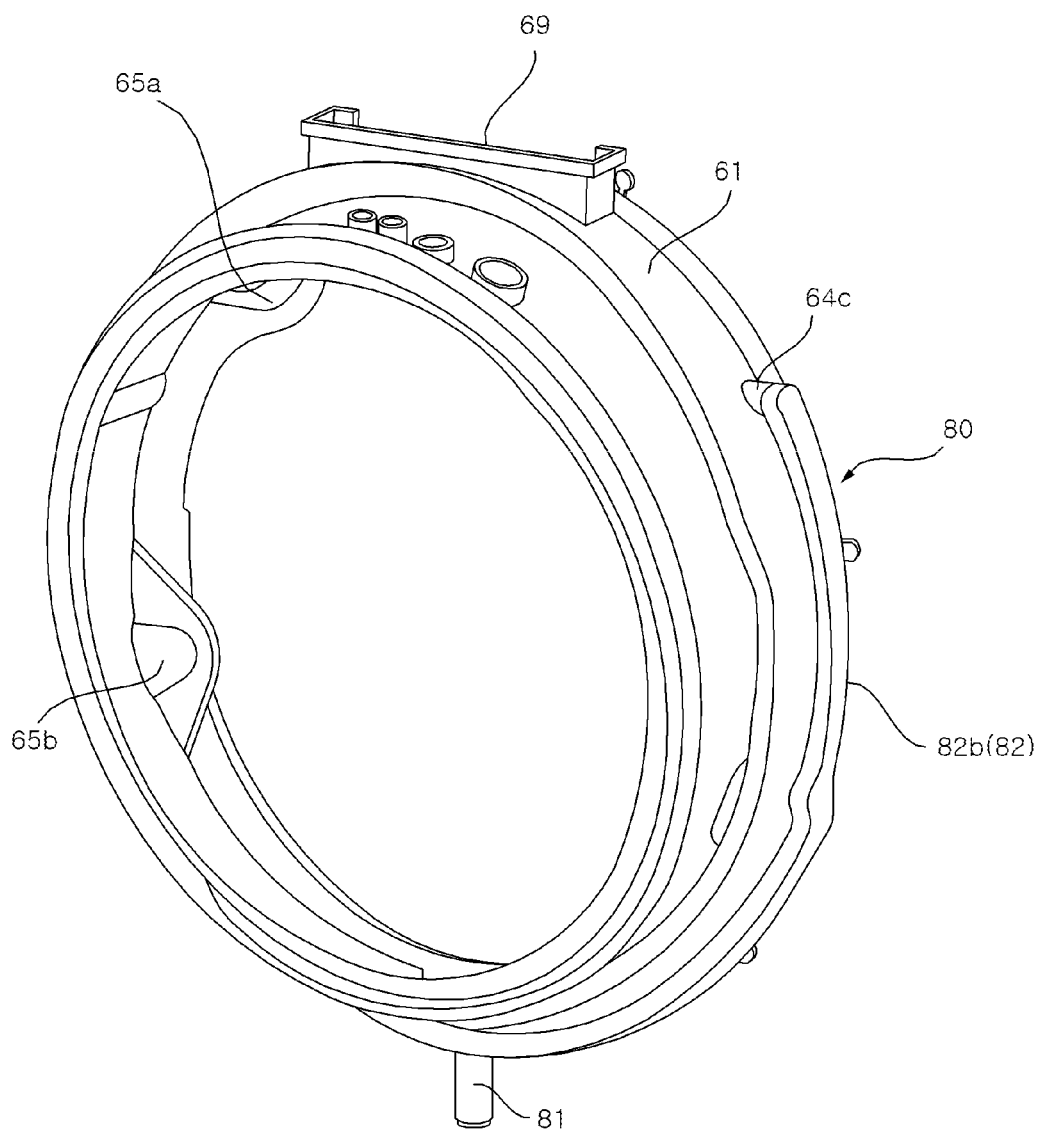
FIG. 11 illustrates a part of a washing machine according to another embodiment of the present invention.

The present invention is not limited to the embodiment, and the number of the port insertion conduit 64, the protrusion 65, and the nozzle 66, as well as the number of the nozzle water supply ports 84, can be changed, and the positions where they are formed can also be changed. FIG. 11 illustrates a part of a washing machine according to another embodiment of the present invention. Hereinafter, the same reference numerals are assigned to the same components as those in the above-described embodiment, and the description thereof will be omitted herein.

Referring to FIG. 11, the washing machine according to another embodiment of the present invention is a washer-and-dryer having a function of blowing air into the tub 30. Such a washing machine includes a drying duct (not shown) for guiding air discharged from the tub 30, a heater (not shown) for heating the air in the drying duct, and an air blowing fan (not shown) for blowing the air in the drying duct (not shown).

The gasket 60 may include an air supply duct 69 communicating with the drying duct and supplying the air blown by the air blowing fan into the tub 30. The air supply duct 69 may be positioned between a closed upper end of the first duct portion 82a and a closed upper end of the second duct portion 82b. The air supply duct 69 protrudes outward from the outer circumferential surface of the gasket 60.

The upper end of the first conduit portion 82a is not connected to the upper end of the first conduit portion 82b (i.e., a structure in which the transfer conduit 82 forms an annular shape), but the upper end of the first conduit portion 82a is closed, the upper end of the second conduit portion 82b is closed, and there exists a gap between the closed upper ends, so that the air supply duct 69 may be disposed in the gap.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A washing machine comprising:
   a casing having a front surface that defines an input port configured to receive laundry;
   a tub located in the casing and configured to receive water, the tub defining a tub opening that communicates with the input port;
   a drum located in the tub and configured to receive laundry, the drum being configured to rotate relative to the tub;
   a pump configured to pump, to the tub, water discharged from the tub;
   a circulation conduit configured to guide water from the pump;
   a gasket having an inner circumferential surface that defines a channel that extends between the input port and the tub opening;
   a plurality of nozzles located at the inner circumferential surface of the gasket and configured to spray water into the drum; and
   a nozzle water supply conduit configured to couple to the gasket and to supply, to the plurality of nozzles, water pumped by the pump,
   wherein the nozzle water supply conduit comprises:
      a circulation inlet port connected to the circulation conduit;
      a transfer conduit comprising:
         a first conduit portion that extends upwardly from the circulation inlet port along an outer circumferential surface of the gasket and that is located at a first side of the gasket, and
         a second conduit portion that extends upwardly from the circulation inlet port along the outer circumferential surface of the gasket and that is located at a second side of the gasket;
      a plurality of first nozzle water supply ports that protrude from the first conduit portion to the gasket and that are connected to two or more of the plurality of nozzles at the first side of the gasket; and
      a plurality of second nozzle water supply ports that protrude from the second conduit portion to the gasket and that are connected to two or more of the plurality of nozzles at the second side of the gasket.

2. The washing machine of claim 1, wherein each of the first conduit portion and the second conduit portion has a first end connected to the circulation inlet port, and a second end that is closed.

3. The washing machine of claim 2, wherein the first side of the gasket is opposite to the second side of the gasket with respect to a center of the gasket,
   wherein the second end of the first conduit portion is located at the first side of the gasket, and
   wherein the second end of the second conduit portion is positioned at the second side of the gasket.

4. The washing machine of claim 1, wherein the gasket defines a plurality of hollows that pass through the gasket in a thickness direction of the gasket from the outer circumferential surface of the gasket to the plurality of nozzles, respectively, and
   wherein the plurality of hollows are configured to receive the plurality of first nozzle water supply ports or the plurality of second nozzle water supply ports, respectively.

5. The washing machine of claim 1, wherein a cross-sectional shape of at least one of the first conduit portion or the second conduit portion has:
- a height that is defined in a radial direction of the gasket; and
- a width that is defined in a longitudinal direction of the channel of the gasket and that is greater than the height of the cross-sectional shape.

6. The washing machine of claim 1, further comprising:
- a first balancing weight configured to couple to the tub at a first side of the tub opening; and
- a second balancing weight configured to couple to the tub at a second side of the tub opening opposite to the first side of the tub opening,
- wherein the first conduit portion is configured to be positioned between the gasket and the first balancing weight, and
- wherein the second conduit portion is configured to be positioned between the gasket and the second balancing weight.

7. The washing machine of claim 6, wherein the circulation inlet port is configured to be positioned between the first balancing weight and the second balancing weight.

8. The washing machine of claim 7, wherein the pump is located vertically below the tub, and
- wherein the circulation inlet port defines:
  - an inlet configured to connect to the circulation conduit and configured to receive water from the pump; and
  - an outlet positioned vertically above the inlet and configured to discharge water from the pump to the first conduit portion and to the second conduit portion.

9. The washing machine of claim 1, wherein the gasket comprises:
- a casing coupling portion configured to couple to a circumference of the casing that defines the input port;
- a tub coupling portion configured to couple to a portion of the tub that defines the tub opening; and
- an extension portion that extends from the casing coupling portion to the tub coupling portion, and
- wherein each of the plurality of nozzles comprises:
  - a nozzle inflow conduit that protrudes from an inner circumferential surface of the extension portion and that is configured to communicate with one of the first nozzle water supply ports or one of the second nozzle water supply ports; and
  - a nozzle head connected to the nozzle inflow conduit and configured to spray, into the drum, water supplied through the nozzle inflow conduit.

10. The washing machine of claim 9, wherein the gasket further comprises:
- a plurality of port insertion conduits that protrude from an outer circumferential surface of the extension portion, each port insertion conduit being configured to communicate with the nozzle inflow conduit and to receive one of the plurality of first nozzle water supply ports or one of the plurality of second nozzle water supply ports.

11. The washing machine of claim 10, wherein the extension portion of the gasket comprises:
- a cylindrical rim portion that extends rearward from the casing coupling portion; and
- a folded portion located between the cylindrical rim portion and the tub coupling portion, the folded portion having a shape corresponding to displacement of the tub,
- wherein the folded portion comprises:
  - an inner diameter portion that is bent from the cylindrical rim portion toward the casing coupling portion; and
  - an outer diameter portion that is bent from the inner diameter portion toward the tub coupling portion,
- wherein each port insertion conduit protrudes from an outer circumferential surface of the outer diameter portion, and
- wherein the nozzle inflow conduit protrudes from an inner circumferential surface of the outer diameter portion.

12. The washing machine of claim 1, wherein the transfer conduit defines a flow path having a cross-sectional area that decreases from a lower portion of the flow path toward an upper portion of the flow path.

13. The washing machine of claim 12, wherein a width of the flow path decreases from the lower portion of the flow path toward the upper portion of the flow path.

14. The washing machine of claim 1, wherein the pump comprises a variable speed motor.

15. The washing machine of claim 1, wherein the circulation inlet port protrudes radially outward from the outer circumferential surface of the gasket, and
- wherein each of the first nozzle water supply ports and each of the second nozzle water supply ports protrude radially inward to the outer circumferential surface of the gasket.

16. The washing machine of claim 1, wherein at least two first nozzles among the plurality of nozzles are located at the first conduit portion and arranged vertically at the first conduit portion, and
- wherein the two first nozzles comprise:
  - an upper nozzle configured to spray water downward into the drum; and
  - a lower nozzle located vertically below the upper nozzle and configured to spray water upward into the drum.

17. The washing machine of claim 16, wherein at least two second nozzles among the plurality of nozzles are located at the second conduit portion and arranged vertically at the second conduit portion, and
- wherein the two second nozzles comprise:
  - an upper nozzle configured to spray water downward into the drum; and
  - a lower nozzle located vertically below the upper nozzle and configured to spray water upward into the drum.

18. The washing machine of claim 1, wherein the plurality of nozzles comprise:
- a first upper nozzle located at a first side of the drum with respect to a vertical plane passing through a center of the drum, the first upper nozzle being configured to spray water downward toward a second side of the drum opposite to the first side with respect to the vertical plane;
- a second upper nozzle located at the second side of the drum and configured to spray water downward toward the first side of the drum;
- a first lower nozzle located at the first side of the drum vertically below the first upper nozzle and the second upper nozzle, the first lower nozzle being configured to spray water upward toward the second side of the drum; and
- a second lower nozzle located at the second side of the drum vertically below the first upper nozzle and the second upper nozzle, the second lower nozzle being configured to spray water upward toward the first side of the drum.

19. The washing machine of claim 1, wherein the circulation conduit is made of an amorphous soft material, and wherein a hardness level of the transfer conduit is greater than a hardness level of the circulation conduit.

20. The washing machine of claim 19, wherein the transfer conduit is made of high-density polyethylene (HDPE) or polypropylene (PP).

* * * * *